W. A. WODHAM.
IMPLEMENT DRAFT AND STEERING MEANS.
APPLICATION FILED JUNE 24, 1918.
1,297,628.
Patented Mar. 18, 1919.
2 SHEETS—SHEET 1.
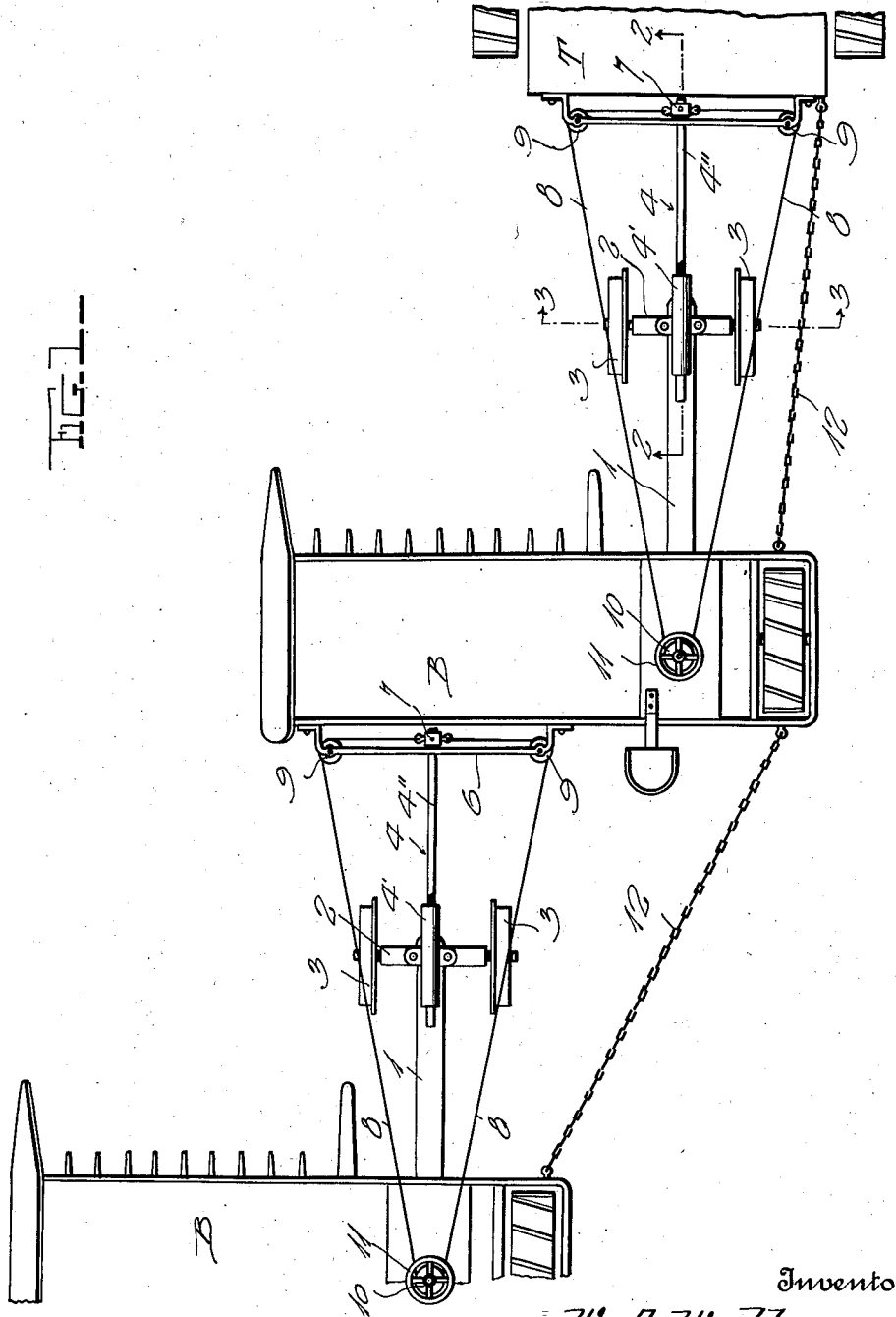
Witness
H. Woodard
Inventor
W. A. Wodham
By H. B. Willson & Co.
Attorneys W. A. WODHAM.
IMPLEMENT DRAFT AND STEERING MEANS.
APPLICATION FILED JUNE 24, 1918.
1,297,628.
Patented Mar. 18, 1919.
2 SHEETS—SHEET 2.
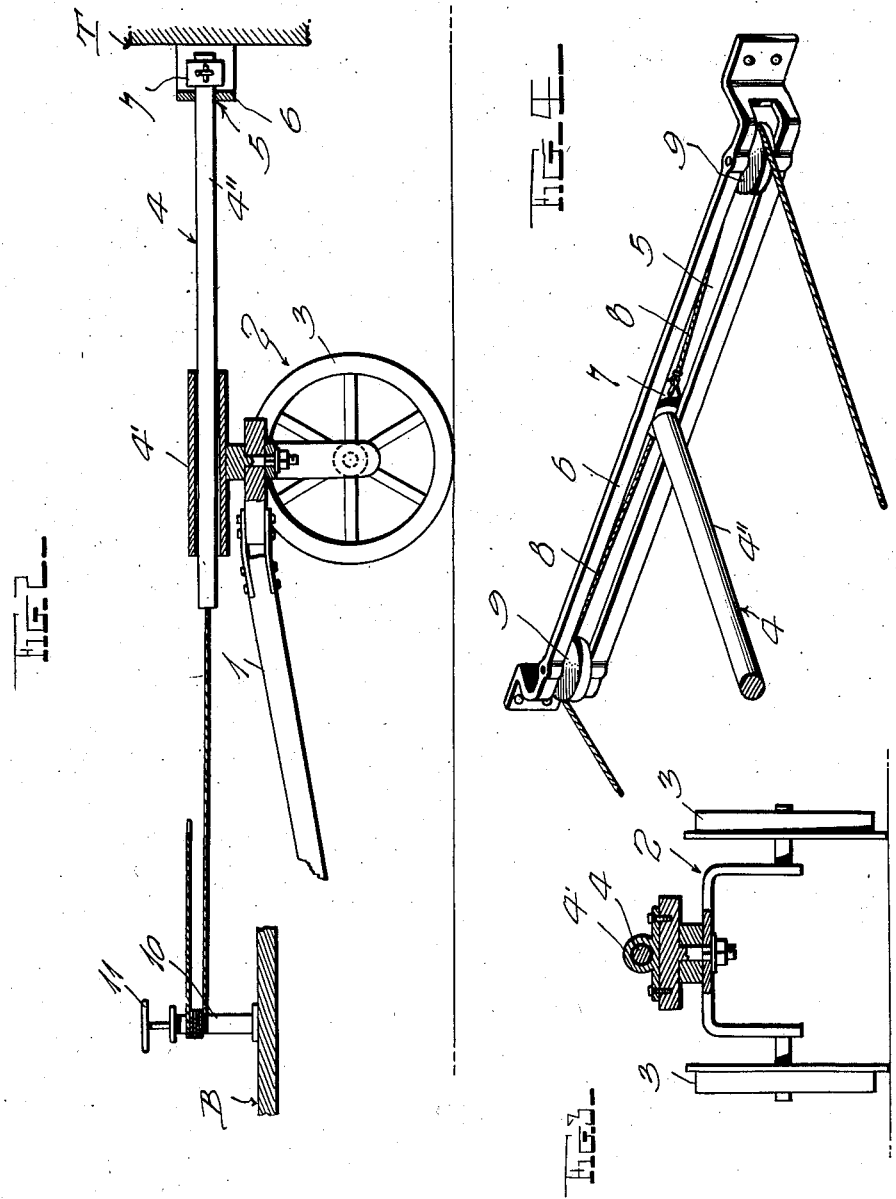
Witness
H. Woodard
Inventor
W. A. Wodham
By H. B. Williamson & Co.
Attorneys

UNITED STATES PATENT OFFICE.

WILLIAM A. WODHAM, OF MOORHEAD, MINNESOTA.

IMPLEMENT DRAFT AND STEERING MEANS.

1,297,628.     Specification of Letters Patent.     Patented Mar. 18, 1919.

Application filed June 24, 1918. Serial No. 241,622.

*To all whom it may concern:*

Be it known that I, WILLIAM A. WODHAM, a citizen of the United States, residing at Moorhead, in the county of Clay and State of Minnesota, have invented certain new and useful Improvements in Implement Drafts and Steering Means; and I do declare the following to be a full, clear, and exact description of the invention, such as will enable others skilled in the art to which it appertains to make and use the same.

My invention has for its object to provide a simple yet efficient arrangement of parts for connecting several binders or the like in tandem, for drawing them with a tractor in such manner as to turn properly at corners without leaving the corner areas partly uncut.

With the foregoing general object in view, the invention resides in the novel features of construction and unique combinations of parts to be hereinafter fully described and claimed, the descriptive matter being supplemented by the accompanying drawings which form a part of this application and which:

Figure 1 is a diagrammatic top plan view showing the application of my invention in connecting a pair of binders and in hitching the front binder to a tractor;

Fig. 2 is a detail longitudinal section on the plane indicated by the line 2—2 of Fig. 1;

Fig. 3 is a transverse section on the plane of the line 3—3 of Fig. 1; and,

Fig. 4 is a perspective view of the front end of the tongue, its guide, and the means for shifting said tongue along said guide.

In the drawings above briefly described, a pair of binders B are shown drawn by a tractor T through the instrumentality of the present hitch and steering means. Each binder B or other machine which is to be drawn by the tractor, is in most cases provided with a forwardly projecting stub tongue to which a front truck 2 is pivoted, said truck having flanged wheels 3 to travel on the ground. Extending forwardly from the truck 2 for the purpose of steering the same, is a forwardly and rearwardly shiftable tongue 4, said tongue being by preference formed of telescopic sections. The rear section 4' of the tongue 4 is in the form of a tubular guide secured to the truck 2 to turn bodily therewith, while the front section 4" is merely in the form of a pole whose rear end is received slidably in the guide 4'.

The front end of the tongue 4 is received in a slot 5 formed in a transverse guide bar 6, one of these bars being secured to each binder but the posterior one, while another is secured to the tractor T. The front end of tongue 4 is provided with a head 7 to prevent movement thereof from the slot 5, and a pair of cables 8 are secured at one end to said head, said cables passing around pulleys 9 at the ends of the bar 6 and then leading rearwardly to a suitable windlass 10 mounted on the bunk of the binder and provided with a hand wheel 11. Any preferred means not shown may be provided for locking the windlass 10 against rotation but when said windlass is turned in one direction or the other, one cable 8 will be wound and the other unwound, so that the tongue 4 is shifted to one side or the other to steer the machine in the required manner.

The strain of pulling the several machines is not exerted on the cables 8, but upon draft chains 12 connecting the several machines and spaced laterally from the trucks 2. In turning to the left at corners, and in again straightening the course of the train of machines after making the turn, the front section 4" of each tongue slides in its respective rear section 4' to permit free turning movement without any binding or tendency to break any part. When making a turn, the hand wheel 11 is turned so as to properly position the trucks 2, thus preventing the machines from turning short of the corner and skipping the grain or the like by so doing.

From the foregoing, taken in connection with the accompanying drawing, it will be obvious that although my invention is of comparatively simple and inexpensive nature, it will be highly efficient and in every way desirable. Since probably the best results are obtained from the details shown and described, they are preferably followed, but within the scope of the invention as claimed, numerous minor changes may well be made. Furthermore, although I have illustrated and described the invention in connection with a plurality of binders and a tractor, it is obvious that it may be employed for connecting and steering all kinds of machines when arranged in tandem, regardless of the means provided for drawing said machines forwardly or propelling them.

I claim:

1. The combination with a front and a rear wheeled machine, a steering truck pivoted to said rear machine, and a pull chain offset from the truck and connecting said machines; of a longitudinal tube secured to said truck, a tongue whose rear end is slidable in said tube, a transverse guide on the front machine along which the front end of said tongue is movable, and means for moving said tongue end along said guide.

2. The combination with a front and a rear wheeled machine, a steering truck pivoted to said rear machine, and a pull member offset from the truck and connecting the two machines; of a longitudinal guide secured to said truck, a tongue extending forwardly from said truck, said tongue being in permanent alinement with and slidable at its rear end along said guide, and means for connecting the front end of said tongue with said front machine and for swinging it laterally with respect thereto.

3. The combination with a front and a rear wheeled machine, a steering truck pivoted to said rear machine, and a pull member offset from the truck and connecting said machines; of a longitudinal tube secured to said truck, a tongue whose rear end is slidable in said tube, and means for connecting the front end of said tongue to said front machine and for swinging it laterally with respect thereto.

In testimony whereof I have hereunto set my hand.

WILLIAM A. WODHAM

Witnesses:
EDWIN ADAMS,
AGNES GORMAN.